United States Patent [19]

Johannesen

[11] Patent Number: 5,137,203
[45] Date of Patent: Aug. 11, 1992

[54] METHOD FOR MANUFACTURING A DRUM BRAKE SHOE

[75] Inventor: Donald D. Johannesen, South Bend, Ind.

[73] Assignee: Allied-Signal Inc., Morristown, N.J.

[21] Appl. No.: 699,025

[22] Filed: May 13, 1991

[51] Int. Cl.⁵ .................. B23K 11/32; F16D. 65/06
[52] U.S. Cl. ................... 228/146; 228/265; 188/250 D
[58] Field of Search ............ 228/136, 146, 189, 17, 228/173.6, 185, 15.1, 125, 144; 188/250 C, 250 D; 219/93, 91.23, 86.22, 86.1, 81, 83; 29/520

[56] References Cited

U.S. PATENT DOCUMENTS

| | | | |
|---|---|---|---|
| 1,659,368 | 2/1928 | Long | 188/250 D |
| 1,736,539 | 11/1929 | Lachman | 228/189 |
| 1,737,013 | 11/1929 | Brie | 188/250 D |
| 1,818,090 | 8/1931 | Peterson | 188/250 D |
| 1,826,283 | 10/1931 | Mooers | 188/250 D |
| 1,937,997 | 12/1933 | Townsend | 188/250 D |
| 2,541,253 | 2/1951 | House | 188/250 D |
| 3,265,166 | 8/1966 | Lavengood | 188/250 D |
| 3,878,749 | 4/1975 | Carmeli | 83/616 |
| 4,387,288 | 6/1983 | Boros | 219/107 |

Primary Examiner—Richard K. Seidel
Assistant Examiner—Jeanne M. Elpel
Attorney, Agent, or Firm—Larry J. Palguta; Ken C. Decker

[57] ABSTRACT

A drum brake shoe is provided by fine blanking the brake shoe web (50) so that the web (50) has radially extending weld projections (60) at a circumferential edge (52), with a radial recess (62) disposed on each side of a weld projection (60). As a brake shoe rim (40) is fed through a welding and forming mechanism (65), a flat surface (41) of the rim (40) engages a radially extending weld projection (60) and a weld is effected. Welding wheels (90, 100) of the mechanism (65) rotate to bend the rim (40) and engage the rim (40) with the next weld projection as a weld is effected between the rim (40) and web (50). The manufacturing method will provide a more consistent welding process that will result in a higher percentage of quality welds and less scrappage.

2 Claims, 2 Drawing Sheets

METHOD FOR MANUFACTURING A DRUM BRAKE SHOE

The present invention relates to a method for manufacturing a drum brake shoe, in particular the welding of a brake shoe rim to a brake shoe web.

Drum brake shoes have been produced commercially for many years. Goepfrich U.S. Pat. No. 3,100,340 discloses a method which clamps the edges of a shoe rim opening about a shoe web projection in order to attach the rim to the shoe. This method requires holes to be formed in the shoe rim and results in added cost and manufacturing time. Currently, an automatic welding and forming mechanism feeds automatically a rim from a rim magazine to an area between a pair of rotating drums with a lower drum being a rotatable welding drum which has attached thereto a brake shoe web. As a rim projection of the rim is positioned orthogonally on a part of the brake shoe web relative to a longitudinal plane of the web, the mechanism spot welds the rim to the shoe and then rotates the welding wheel so that the brake shoe ring is formed in an arcuate shape corresponding to the circumferential edge of the brake shoe web to which it is welded. As the rotatable welding wheel rotates, the series of rim projections engage, in order, the edge of the web and are welded to the web. This manufacturing process requires that the rim be loaded into the rim magazine so that the top and bottom surface of the rim are oriented properly such that the rim projections will be on the side of the rim which engages the circumferential edge of the web. The welding and forming mechanism must position the rim axially relative to the web so that the rim projection will engage the circumferential edge of the web. This prior manufacturing method tends to provide, over time, rim projections which vary somewhat in size as the die providing the rim experiences wear. There can be a variation in rim projection size according to the stock thickness and hardness variation of the rim material. Additionally, this process does not follow the desired method of providing projections on the heavy material and sizing the projections as a function of the thin material. The drum brake shoe rim is made of the thinner material while the shoe web is made of a heavier material.

The present invention provides solutions to the above problems by providing a method for manufacturing a drum brake shoe from parts comprising a brake shoe rim and a brake shoe web, the brake shoe web having along the circumference thereof a plurality of radially extending weld projections which extend beyond a circumferential edge of the brake shoe web, comprising the steps of:

connecting said brake shoe web with a rotatable first drum of a welding mechanism such that the brake shoe web is positioned firmly, feeding a brake shoe rim between the first drum and a second drum of the welding mechanism such that a flat surface of said rim engages a radially extending weld projection and the rim is disposed orthogonally relative to a longitudinal plane of said web, and operating said welding mechanism so that the rim is welded to and bent about the circumferential edge of the brake shoe web, the mechanism effecting a weld at each engagement of a radially extending weld projection and the flat surface of the shoe rim as the first drum rotates the web and attached rim.

One way of carrying out the invention is described in detail below with reference to the drawings which illustrate an embodiment and manufacturing method in which.

Figure 1:
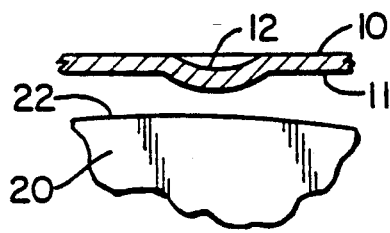
FIG. 1 is a partial schematic side view illustration of a prior art drum brake shoe rim and drum brake shoe web prior to welding.

FIG. 1 illustrates a drum brake rim 10 and a drum brake web 20 made in accordance with a prior method of manufacture. Drum brake rim 10 includes rim projection 12 that is formed by a punching operation. Web 20 includes circumferential edge 22 which is disposed opposite rim 10. As rim 10 and web 20 are handled by an automatic welding and forming machine, rim projection 12 is brought into contact with circumferential edge 22 and a weld effected at the engagement. The machine effects a weld between projection 12 and edge 22 as rim 10 engages web 20. The resulting drum brake shoe has flat surface 11 of rim 10 in contact with circumferential edge 22 of web 20 and the rim and web welded together at the position of former projection 12.

Figure 2:
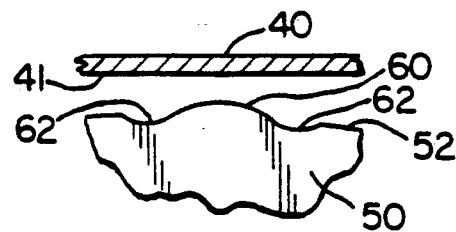
FIG. 2 is a partial schematic side view illustration of a drum brake shoe rim and drum brake shoe web prior to welding and made in accordance with the present invention.
Figure 3:
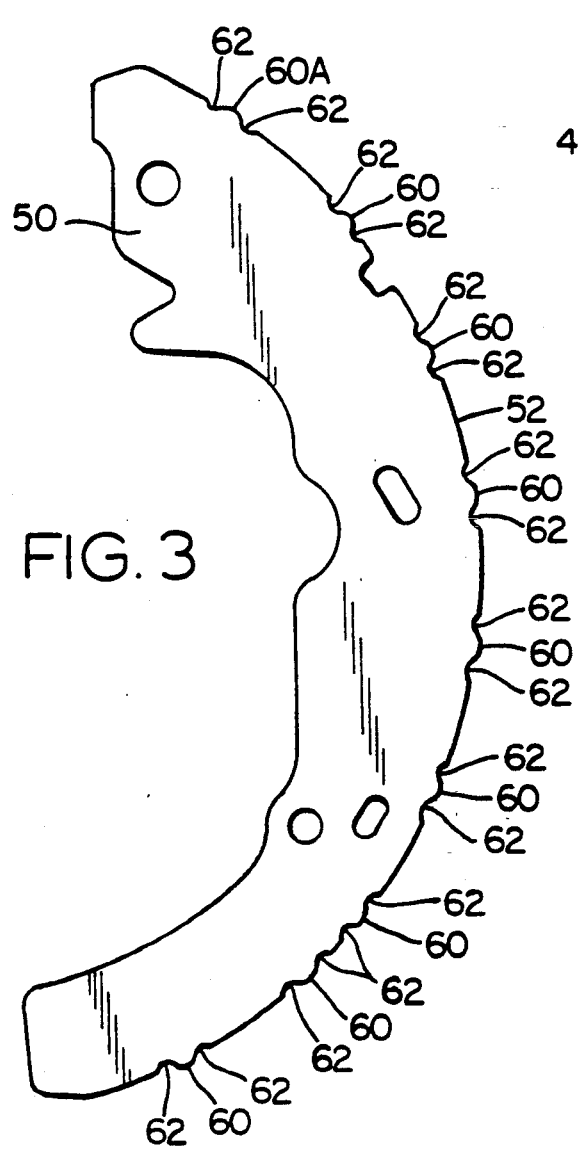
FIG. 3 is an illustration of a drum brake shoe web in accordance with the present invention.
Figure 4:
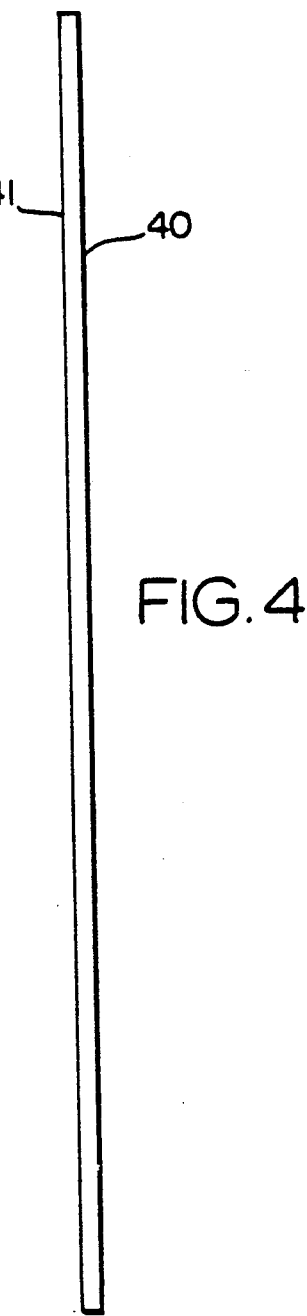
FIG. 4 is an illustration of a drum brake shoe rim in accordance with the present invention.

The present invention provides an improved manufacturing process which can reduce scrappage by providing a higher percentage of quality welds as a result of the elimination of manufacturing variabilities. FIG. 2 illustrates a partial schematic illustration of drum brake shoe rim 40 which begins as a piece of flat, longitudinally extending stock and a drum brake shoe web 50 having along its circumference a plurality of radially extending weld projections 60. Each weld projection 60 extends beyond circumferential edge 52 of web 50. It is very important that projections 60 be accurately and precisely formed so that the welding process will produce consistent, reliable welds. This critical forming of the projections can now be accomplished by what is known as a "fine blanking" process, wherein each of the parts being formed in the process are held firmly in position. Located adjacent each weld projection 60 and circumferentially spaced apart is a pair of weld projection radial recesses 62. Recesses 62 are provided so that during the welding process weld splash (i.e. molten metal) will have a pair of locations into which to flow. FIGS. 3 and 4 illustrate drum brake shoe web 50 and drum brake shoe rim 40 which are to be placed within an automatic welding and forming machine. Web 50 includes the plurality of circumferentially spaced apart radial weld projections 60 along circumferential edge 52, with each projection 60 having located at each side thereof a projection radial recess 62.

Figure 5:
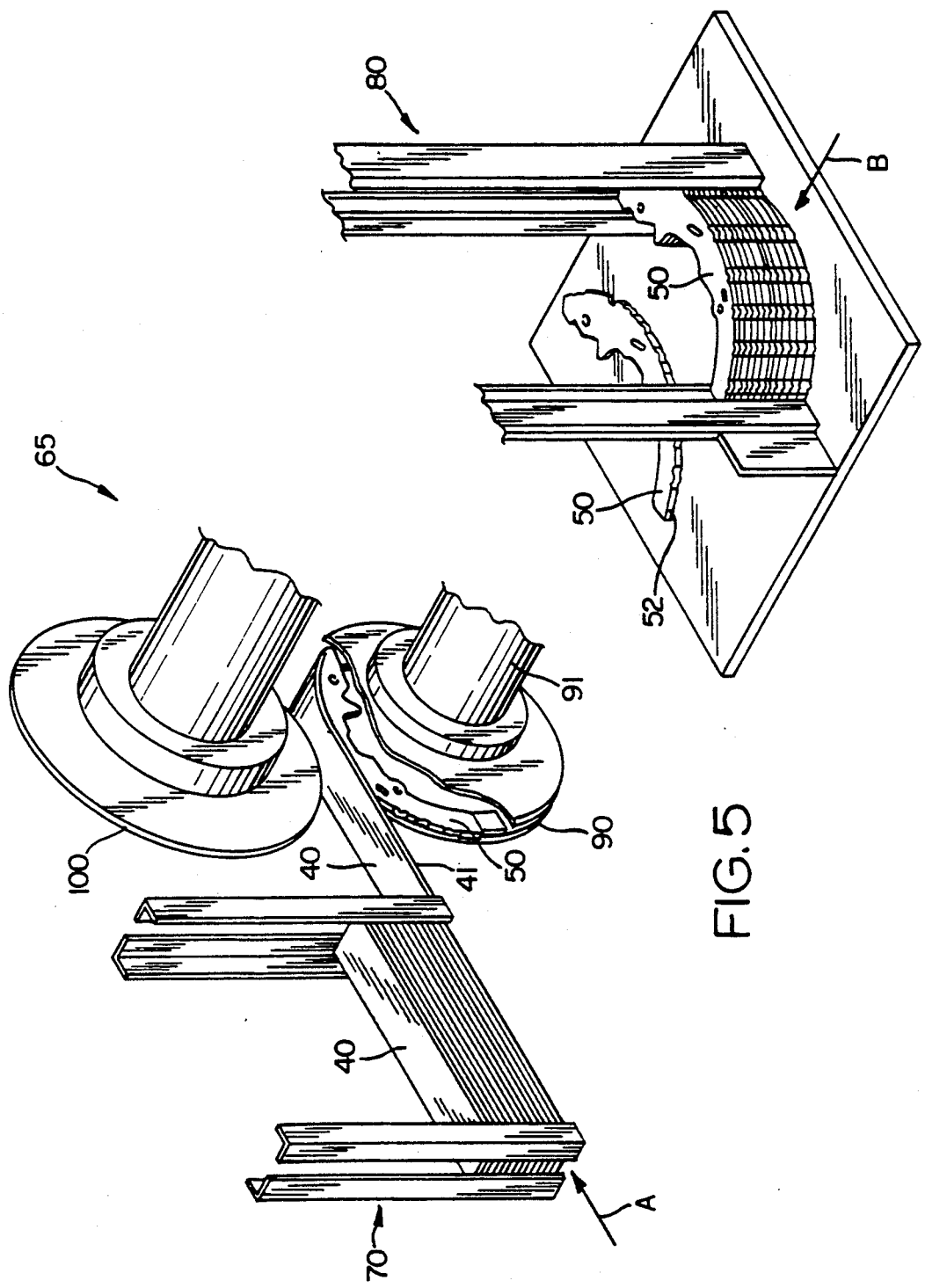
FIG. 5 is a partial schematic illustration of a welding and forming machine effecting the manufacturing method of the present invention.

Referring now to FIG. 5, the partial schematic illustration is of a standard prior automatic welding and forming mechanism 65 which can effect the manufacturing method of the present invention. A plurality of drum brake shoe rims 40 are stacked in a rim magazine 70 which automatically feeds rims 40 in the direction of arrow A toward first 90 and second 100 drums of mechanism 65. Mechanism 65 also includes automatic shoe web feeding magazine 80 which contains a plurality of webs 50. Each web 50 is moved in the direction of arrow B and oriented, in order, to rotatable first drum 90 and where plunger 91 (shown broken away) holds the web securely against drum 90. Second drum 100 is positioned adjacent first drum 90 so that as a rim 40 is fed by magazine 70 between drums 90 and 100, web 50 engages rim 40 at an initial radial weld projection 60A (see FIG. 3). Rim 40 is disposed perpendicular relative to a longitudinal plane of web 50. Mechanism 65 operates drums 90, 100 which are welding wheels that weld together flat surface 41 of rim 40 and the opposing radial weld projection 60A. Mechanism 65 effects a welding together of the rim and web such that each weld projection, in order, is reduced radially in size and flat surface 41 of rim 40 engages circumferential edge 52 of web 50. As the drums 90, 100 rotate, each weld helps to keep the rim and web together so that the rim is bent or formed to the arcuate shape of edge 52. After rotatable drums 90 and 100 have rotated to weld sequentially together each weld projection and flat surface 41, the assembled drum brake shoe comprising the rim and web is released by mechanism 65 so that it falls out of the mechanism.

The manufacturing method disclosed by the present invention will provide substantial advantages over the prior manufacturing method. Because the drum brake shoe rim no longer contains a projection (see FIG. 1) and which previously had to be oriented so that the projection would engage the circumferential edge of the brake shoe web, rims 40 may simply be loaded into rim magazine 70 without regard to any top/bottom surface orientation. The manufacturing process will provide for a better timing of the weld firing sequence. The web can be readily located within the fixture whereas the rim is dynamically fed into the fixture and this would allow for a more random positioning of the weld projections relative to weld firing time. This positioning improvement applies to both axial and circumferential positioning between the rim and web. The manufacturing method of the present invention would provide for an improved forming of the radially extending weld projections. The drum brake shoe web is provided by a fine edge blanking process that is more accurate, precise, and consistent than forming operations utilizing a conventional stamping press. The projection size would not vary as a function of die wear, incoming stock thickness and hardness variation. The provision of a projection recess at each circumferential side of a radial weld projection would effect a relief for receiving weld splash. Also, the manufacturing method of the present invention would result in an improved rotatable drum 100 contact against the adjacent flat surface of the rim as opposed to the prior method where the drum engaged a rim projection depression (see FIG. 1). The present method would effect an improved forming of the rim radius because the rim no longer has localized stiffness at rim weld projections, such stiffness resulting from ribbing and work hardening effects. Also, the new method and resulting drum brake shoe can be practiced and made on a standard automatic welding and forming mechanism without any modification thereof Finally, the method of the present invention is in conformance with a rule for good projection welding practice wherein the projections are provided on the heavy material (the web) and the projections are then sized as a function of the thin material (rim). Because the size of the weld projections on the drum brake shoe web may be readily sized from the heavier material of the web, the projections can be varied readily as a function of the thinner material of the drum brake shoe rim.

I claim:

1. A method for manufacturing a drum brake shoe from parts comprising a brake shoe rim and a brake shoe web, the brake shoe web having along the circumference thereof a plurality of radially extending web projections which extend beyond a circumferential arcuate edge of the brake shoe web, the web projections having adjacent radial recesses for receiving weld splash, comprising the steps of:

connecting said brake shoe web with a rotatable first drum of a welding mechanism such that the brake shoe web is positioned firmly, feeding a brake shoe rim between the first drum and a second drum of the welding mechanism such that a planar bottom surface of said rim abuts a radially extending web projection and the rim is disposed orthogonally relative to a longitudinal plane of said web, and operating said welding mechanism so that the rim is welded to and bent about the circumferential arcuate edge of the brake shoe web, the mechanism effecting a weld at each abutment of a radially extending web projection and the bottom surface of the shoe rim as the first drum rotates the web and attached rim such that the circumferential arcuate edge of the web engages an inner arcuate surface formed from said planar bottom surface.

2. The method in accordance with claim 1, further comprising the step of forming initially the weld projections by means of a fine blanking process.

* * * * *